United States Patent
Klaassen

(10) Patent No.: US 7,211,351 B2
(45) Date of Patent: May 1, 2007

(54) LITHIUM/AIR BATTERIES WITH LIPON AS SEPARATOR AND PROTECTIVE BARRIER AND METHOD

(75) Inventor: Jody J. Klaassen, Minneapolis, MN (US)

(73) Assignee: Cymbet Corporation, Elk River, MN (US)

( * ) Notice: Subject to any disclaimer, the term of this patent is extended or adjusted under 35 U.S.C. 154(b) by 615 days.

(21) Appl. No.: 10/895,445

(22) Filed: Oct. 16, 2003

(65) Prior Publication Data
US 2005/0095506 A1 May 5, 2005

(51) Int. Cl.
*H01M 2/16* (2006.01)

(52) U.S. Cl. .................... 429/247; 429/27; 429/28; 429/129; 429/245; 429/42; 29/623.5; 427/115; 427/58

(58) Field of Classification Search .............. 429/27, 429/28, 129, 322, 245, 42, 247; 29/623.5; 427/115, 58

See application file for complete search history.

(56) References Cited

U.S. PATENT DOCUMENTS

| | | | |
|---|---|---|---|
| 3,419,487 A | 12/1968 | Robbins et al. |
| 4,207,119 A | 6/1980 | Tyan |
| 4,299,890 A | 11/1981 | Rea et al. |
| 4,328,262 A | 5/1982 | Kurahashi et al. |
| 4,333,808 A | 6/1982 | Bhattacharyya et al. |
| 4,353,160 A | 10/1982 | Armini et al. |
| 4,365,107 A | 12/1982 | Yamauchi |
| 4,435,445 A | 3/1984 | Allred et al. |
| 4,440,108 A | 4/1984 | Little et al. |
| 4,481,265 A | 11/1984 | Ezawa et al. |
| 4,520,039 A | 5/1985 | Ovshinsky |
| 4,539,660 A | 9/1985 | Miyauchi et al. |
| 4,633,129 A | 12/1986 | Cuomo et al. |
| 4,645,726 A | 2/1987 | Hiratani et al. |
| 4,684,848 A | 8/1987 | Kaufman et al. |
| 4,696,671 A | 9/1987 | Epstein et al. |
| 4,730,383 A | 3/1988 | Balkanski |
| 4,740,431 A | 4/1988 | Little |
| 4,798,574 A | 1/1989 | Marsik |
| 4,832,463 A | 5/1989 | Goldner et al. |
| 4,862,032 A | 8/1989 | Kaufman et al. |
| 5,017,550 A | 5/1991 | Shioya et al. |
| 5,022,930 A | 6/1991 | Ackerman et al. |
| 5,051,274 A | 9/1991 | Goldner et al. |
| 5,064,520 A | 11/1991 | Miyake et al. |

(Continued)

FOREIGN PATENT DOCUMENTS

DE      19948742      12/2000

(Continued)

OTHER PUBLICATIONS

Aramoto, T., et al., "16.0% Efficient Thin-Film CdS/CdTe Solar Cells", *Jpn. J. Appl. Phys.*, vol. 36, Pt. 1, No. 10, (1997),6304-6305.

(Continued)

*Primary Examiner*—Laura Weiner
(74) *Attorney, Agent, or Firm*—Charles A. Lemaire; Lemaire Patent Law Firm, P.L.L.C.

(57) ABSTRACT

A method and apparatus for making lithium/air batteries with LiPON as separator and protective barrier, and the resulting cell(s) and/or battery(s). Some embodiments include an apparatus that includes a lithium anode; a polymer-air cathode; and a LiPON separator between the anode and cathode. In some embodiments, the polymer-air cathode includes a carbon-polyfluoroacrylate material. In some embodiments, the anode overlays a copper anode contact.

21 Claims, 2 Drawing Sheets

Schematic cross section of lithium-air micro-cell.

U.S. PATENT DOCUMENTS

| | | |
|---|---|---|
| 5,089,104 A | 2/1992 | Kanda et al. |
| 5,098,737 A | 3/1992 | Collins et al. |
| 5,115,378 A | 5/1992 | Tsuchiya et al. |
| 5,126,031 A * | 6/1992 | Gordon et al. ............. 429/41 |
| 5,151,848 A | 9/1992 | Finello |
| 5,166,009 A | 11/1992 | Abraham et al. |
| 5,171,413 A | 12/1992 | Arntz et al. |
| 5,180,645 A | 1/1993 | More |
| 5,189,550 A | 2/1993 | Goldner et al. |
| 5,192,947 A | 3/1993 | Neustein |
| 5,202,196 A | 4/1993 | Wang et al. |
| 5,202,201 A | 4/1993 | Meunier et al. |
| 5,261,968 A | 11/1993 | Jordan |
| 5,273,837 A | 12/1993 | Aitken et al. |
| 5,296,122 A | 3/1994 | Katsube et al. |
| 5,314,765 A | 5/1994 | Bates |
| 5,338,625 A | 8/1994 | Bates et al. |
| 5,348,703 A | 9/1994 | Bishop et al. |
| 5,393,572 A | 2/1995 | Dearnaley |
| 5,411,592 A | 5/1995 | Ovshinsky et al. |
| 5,415,717 A | 5/1995 | Perneborn |
| 5,425,966 A | 6/1995 | Winter et al. |
| 5,426,561 A | 6/1995 | Yen et al. |
| 5,433,096 A | 7/1995 | Janssen et al. |
| 5,445,126 A | 8/1995 | Graves, Jr. |
| 5,445,906 A | 8/1995 | Hobson et al. |
| 5,448,110 A | 9/1995 | Tuttle et al. |
| 5,449,994 A | 9/1995 | Armand et al. |
| 5,455,126 A | 10/1995 | Bates et al. |
| 5,468,521 A | 11/1995 | Kanai et al. |
| 5,482,611 A | 1/1996 | Helmer et al. |
| 5,494,762 A | 2/1996 | Isoyama et al. |
| 5,501,175 A | 3/1996 | Tanaka et al. |
| 5,501,924 A | 3/1996 | Swierbut et al. |
| 5,510,209 A | 4/1996 | Abraham et al. |
| 5,512,147 A | 4/1996 | Bates et al. |
| 5,523,179 A | 6/1996 | Chu |
| 5,528,222 A | 6/1996 | Moskowitz et al. |
| 5,529,671 A | 6/1996 | Debley et al. |
| 5,536,333 A | 7/1996 | Foote et al. |
| 5,549,989 A | 8/1996 | Anani |
| 5,558,953 A | 9/1996 | Matsui et al. |
| 5,561,004 A | 10/1996 | Bates et al. |
| 5,567,210 A | 10/1996 | Bates et al. |
| 5,569,520 A | 10/1996 | Bates |
| 5,569,564 A | 10/1996 | Swierbut et al. |
| 5,571,749 A | 11/1996 | Matsuda et al. |
| 5,582,623 A | 12/1996 | Chu |
| 5,585,999 A | 12/1996 | De Long et al. |
| 5,593,551 A | 1/1997 | Lai |
| 5,597,660 A | 1/1997 | Bates et al. |
| 5,599,644 A | 2/1997 | Swierbut et al. |
| 5,601,652 A | 2/1997 | Mullin et al. |
| 5,612,152 A | 3/1997 | Bates et al. |
| 5,626,976 A | 5/1997 | Blanton et al. |
| 5,644,207 A | 7/1997 | Lew et al. |
| 5,654,084 A | 8/1997 | Egert |
| 5,654,111 A | 8/1997 | Minomiya et al. |
| 5,686,201 A | 11/1997 | Chu |
| 5,695,873 A | 12/1997 | Kumar et al. |
| 5,695,885 A | 12/1997 | Malhi |
| 5,705,293 A | 1/1998 | Hobson |
| 5,714,404 A | 2/1998 | Mitlitsky et al. |
| 5,763,058 A | 6/1998 | Isen et al. |
| 5,789,108 A | 8/1998 | Chu |
| 5,814,420 A | 9/1998 | Chu |
| 5,830,331 A | 11/1998 | Kim et al. |
| 5,849,426 A | 12/1998 | Thomas et al. |
| 5,863,337 A | 1/1999 | Neuman et al. |
| 5,868,914 A | 2/1999 | Landsbergen et al. |
| 5,872,080 A | 2/1999 | Arendt et al. |
| 5,914,507 A | 6/1999 | Polla et al. |
| 5,925,483 A | 7/1999 | Kejha et al. |
| 5,932,284 A | 8/1999 | Reynolds |
| 5,935,727 A | 8/1999 | Chiao |
| 5,953,677 A | 9/1999 | Sato |
| 5,978,207 A | 11/1999 | Anderson et al. |
| 5,981,107 A | 11/1999 | Hamano et al. |
| 5,982,284 A | 11/1999 | Baldwin et al. |
| 5,995,006 A | 11/1999 | Walsh |
| 6,001,715 A | 12/1999 | Manka et al. |
| 6,002,208 A | 12/1999 | Maishev et al. |
| 6,023,610 A | 2/2000 | Wood, Jr. |
| 6,025,094 A | 2/2000 | Visco et al. |
| 6,033,471 A | 3/2000 | Nakanishi et al. |
| 6,037,717 A | 3/2000 | Maishev et al. |
| 6,042,687 A | 3/2000 | Singh et al. |
| 6,056,857 A | 5/2000 | Hunt et al. |
| 6,059,847 A | 5/2000 | Farahmandi et al. |
| 6,077,621 A | 6/2000 | Allen et al. |
| 6,078,791 A | 6/2000 | Tuttle et al. |
| 6,086,962 A | 7/2000 | Mahoney et al. |
| 6,094,292 A | 7/2000 | Goldner et al. |
| 6,103,412 A | 8/2000 | Hirano et al. |
| 6,110,620 A | 8/2000 | Singh et al. |
| 6,130,507 A | 10/2000 | Maishev et al. |
| 6,133,159 A | 10/2000 | Vaartstra et al. |
| 6,136,165 A | 10/2000 | Moslehi |
| 6,139,964 A | 10/2000 | Sathrum et al. |
| 6,147,354 A | 11/2000 | Maishev et al. |
| 6,153,067 A | 11/2000 | Maishev et al. |
| 6,163,260 A | 12/2000 | Conwell et al. |
| 6,168,884 B1 | 1/2001 | Neudecker et al. |
| 6,175,196 B1 | 1/2001 | Ragner et al. |
| 6,181,237 B1 | 1/2001 | Gehlot |
| 6,181,545 B1 | 1/2001 | Amatucci et al. |
| 6,203,944 B1 | 3/2001 | Turner et al. |
| 6,220,516 B1 | 4/2001 | Tuttle et al. |
| 6,222,117 B1 | 4/2001 | Shiozaki |
| 6,236,061 B1 | 5/2001 | Walpita |
| 6,238,813 B1 | 5/2001 | Maile et al. |
| 6,264,709 B1 | 7/2001 | Yoon et al. |
| 6,277,523 B1 | 8/2001 | Giron |
| 6,280,875 B1 | 8/2001 | Kwak et al. |
| 6,281,795 B1 | 8/2001 | Smith et al. |
| 6,294,722 B1 | 9/2001 | Kondo et al. |
| 6,325,294 B2 | 12/2001 | Tuttle et al. |
| 6,327,909 B1 | 12/2001 | Hung et al. |
| 6,391,664 B1 | 5/2002 | Goruganthu |
| 6,399,489 B1 | 6/2002 | M'Saad et al. |
| 6,402,795 B1 | 6/2002 | Chu et al. |
| 6,402,796 B1 | 6/2002 | Johnson |
| 6,413,675 B1 | 7/2002 | Harada et al. |
| 6,432,577 B1 | 8/2002 | Shul et al. |
| 6,475,854 B2 | 11/2002 | Narwankar et al. |
| 6,558,836 B1 | 5/2003 | Whitacre et al. |
| 6,576,365 B1 | 6/2003 | Meitav et al. |
| 6,576,369 B1 | 6/2003 | Moriguchi et al. |
| 6,576,371 B1 | 6/2003 | Yasuda et al. |
| 6,599,580 B2 | 7/2003 | Muffoletto et al. |
| 6,608,464 B1 | 8/2003 | Lew et al. |
| 6,610,971 B1 | 8/2003 | Crabtree |
| 6,619,123 B2 | 9/2003 | Gianchandani et al. |
| 6,634,232 B1 | 10/2003 | Rettig et al. |
| 6,645,656 B1 | 11/2003 | Chen et al. |
| 6,723,140 B2 | 4/2004 | Chu et al. |
| 6,741,178 B1 | 5/2004 | Tuttle |
| 6,805,998 B2 | 10/2004 | Jenson et al. |
| 6,818,356 B1 | 11/2004 | Bates |
| 6,821,348 B2 | 11/2004 | Baude et al. |
| 6,866,901 B2 | 3/2005 | Burrows et al. |
| 6,906,436 B2 | 6/2005 | Jenson et al. |
| 6,924,164 B2 | 8/2005 | Jenson |
| 6,982,132 B1 | 1/2006 | Goldner et al. |

| | | | |
|---|---|---|---|
| 6,986,965 | B2 | 1/2006 | Jenson et al. |
| 6,989,750 | B2 | 1/2006 | Shanks et al. |
| 7,028,547 | B2 | 4/2006 | Shiratori et al. |
| 2001/0014398 | A1 | 8/2001 | Veerasamy |
| 2001/0033952 | A1 | 10/2001 | Jenson et al. |
| 2001/0043569 | A1 | 11/2001 | Wood, Jr. |
| 2001/0051300 | A1 | 12/2001 | Moriguchi et al. |
| 2002/0000034 | A1 | 1/2002 | Jenson |
| 2002/0037756 | A1 | 3/2002 | Jacobs et al. |
| 2002/0076616 | A1 | 6/2002 | Lee et al. |
| 2002/0110733 | A1 | 8/2002 | Johnson |
| 2002/0184949 | A1 | 12/2002 | Gianchandani et al. |
| 2003/0104590 | A1 | 6/2003 | Santini, Jr. et al. |
| 2003/0171984 | A1 | 9/2003 | Wodka et al. |
| 2004/0077383 | A1 | 4/2004 | Lappetelainen et al. |
| 2004/0094949 | A1 | 5/2004 | Savagian et al. |
| 2004/0131760 | A1 | 7/2004 | Shakespeare |
| 2004/0131761 | A1 | 7/2004 | Shakespeare |
| 2004/0131897 | A1 | 7/2004 | Jenson et al. |
| 2005/0019666 | A1 | 1/2005 | Yasuda |
| 2005/0199282 | A1 | 9/2005 | Oleinick et al. |

FOREIGN PATENT DOCUMENTS

| | | |
|---|---|---|
| EP | 0078404 | 5/1983 |
| EP | 0410627 | 1/1991 |
| EP | 0643544 | 8/1994 |
| EP | 0 691 697 A1 | 1/1996 |
| EP | 0860888 | 8/1998 |
| EP | 0867752 | 9/1998 |
| GB | 2 318 127 A | 4/1998 |
| GB | 2318127 | 4/1998 |
| JP | 58126679 | 7/1983 |
| JP | 59123236 | 7/1984 |
| JP | 60012679 | 1/1985 |
| JP | 62044960 | 2/1987 |
| JP | 63166151 | 1/1990 |
| JP | 03205757 | 9/1991 |
| JP | 03262697 | 11/1991 |
| JP | 06067018 | 3/1994 |
| JP | 6111828 | 4/1994 |
| JP | 6196178 | 7/1994 |
| JP | 06223805 | 8/1994 |
| JP | 07006933 | 1/1995 |
| JP | 07-050229 | 2/1995 |
| JP | 07057739 | 3/1995 |
| JP | 08017179 | 1/1996 |
| JP | 08293310 | 5/1996 |
| JP | 08236105 | 9/1996 |
| JP | 08287901 | 11/1996 |
| JP | 08329983 | 12/1996 |
| JP | 09035233 | 2/1997 |
| JP | 09211204 | 8/1997 |
| JP | 10021896 | 1/1998 |
| JP | 10021933 | 1/1998 |
| JP | 2000188113 | 7/2000 |
| WO | WO-99/33124 | 7/1990 |
| WO | WO-92/15140 | 9/1992 |
| WO | WO-92/16025 | 9/1992 |
| WO | WO-92/19090 | 10/1992 |
| WO | WO-93/14612 | 7/1993 |
| WO | WO-95/14311 | 5/1995 |
| WO | WO-97/38453 | 10/1997 |
| WO | WO-97/39491 | 10/1997 |
| WO | WO-98/13743 | 4/1998 |
| WO | WO-98/47196 | 10/1998 |
| WO | WO-99/25908 | 5/1999 |

OTHER PUBLICATIONS

Birkmire, R. W., et al., "Polycrystalline Thin Film Solar Cells: Present Status and Future Potential", *Annu. Rev. Mater. Sci.*, 27, (1997),pp. 625-653.

Chu, T. L., et al., "13.4% efficient thin-film CdS/CdTe solar cells", *J. Appl. Phys.*, 70(12), (Dec. 15, 1991),pp. 7608-7612.

Dobley, Arthur, et al., "High Capacity Cathodes for Lithium-Air Batteries", Yardney Technical Products, Inc./Lithion, Inc. Pawcatuck, CT <http://www.2.electrochem.org/cgi-bin/abs?mtg=206&abs=0496>.

Dudney, N. J., et al., "Nanocrystalline LixMn2-yO4 Cathodes for Solid-State Thin-Film Rechargeable Lithium Batteries", *Journal of the Electrochemical Society*, 146(7), (1999),pp. 2455-2464.

Dunn, D. , et al., "MoS2 Deposited by ion beam assisted deposition: 2H or random layer structure.", *Naval Research Laboratory*, (1998), pp. 3001-3007.

Goldner, R. , et al., "Ambient Temperature Synthesis of Polycrystalline Thin Films of Lithium Cobalt Oxide with Controlled Crystallites Orientations", *Electrochemical Soc. Proceedings*, 98, (1999),268-273.

Goldner, R. , et al., "Ambient Temperature Synthesis of Polycrystalline Thin Films of Lithium Cobalt Oxide with Controlled Crystallites' Orientation", *Mat. Res. Soc. Symp. Proc.*, 548, (1998),pp. 131-136.

Jacobson, A. J., "Intercalation Chemistry", *In: Encyclopedia of Inorganic Chemistry*, vol. 3, (1994),pp. 1556-1602.

Kyokane, J. , et al., "Organic Solid Capacitor with Conducting Thin Films as Elecrolyte by Ion-Beam-Assisted Deposition", *Journal of Power Sources*, 60, (1996),pp. 151-155.

Liu, W. , et al., "Deposition, Structural Characterization, and Broadband (1KHz-40GHz) Dielectri Behavior of BaxTi2-xOy Thin Films", *Mat. Res. Soc. Symp. Proc.*, 310, (1993),pp. 157-162.

Lugscheider, E. , et al., "Comparison of the Structure of PVD-Thin Films Deposited With Different Deposition Energies", *Surface and Coatings Technology*, 86-87 (1-3), (Dec. 1, 1996), 177-183.

Martin, P. J., et al., "Modification of the Optical and Structural Properties of Dielectric ZrO2 Films by Ion-assisted Deposition", *Journal of Applied Physics*, 55, (1984),235-241.

Mckenzie, D. R., et al., "New Technology for PACVD", *Surface and Coatings Technology*, 82(3), (1996),326-333.

Nomoto, S. , et al., "Back-up Performance of Electric Double-Layer Capacitors for Rechargeable Batteries", *Electrochemical Society Proceedings*, (1997),268-279.

Shodai, T, et al., "Reaction Mechanisms of Li(2.6)Co(0.4) Anode Material", *Solid State Ionics*, (1999),85-93.

Shukla, A. K., et al., "Electrochemical supercapacitors: Energy storage beyond batteries", *Current Science*, vol. 79, No. 12, (Dec. 25, 2000), 1656-1661.

Vereda, F. , et al., "A Study of Electronic Shorting in IBDA-deposited Lipon Films", *Journal of Power Sources*, 89, (2000),201-205.

Yoshida, T. , "Photovoltaic Properties of Screen-Printed CdTe/CdS Solar Cells on Indium-Tin-Oxide Coated Glass Substrates", *J. Electrochem. Soc.*, 142 (9), (Sep. 1995),pp. 3232-3237.

Zeitler, M. , et al., "In Situ Stress Analysis of Boron Nitride Films Prepared by Ion Beam Assisted Deposition", *Nuclear Instruments and Methods in Physics Research B*, 139, (1998),pp. 327-331.

Dobley, Arthur, et al., "High Capacity Cathodes for Lithium-Air Batteries", Yardney Technical Products, Inc./Lithion, Inc. Pawcatuck, CT Electrochemical Society Conference, (May 20, 2004).

Dobley, Arthur, et al., "Non-aqueous Lithium-Air Batteries with an Advanced Cathode Structure", Yardley Technical Products, Inc. / Lithion, Inc. Pawcatuck, CT 41st Power Sources Conference Proceedings, Philadelphia, PA,(Dec. 10, 2003).

Abraham, K M., et al., "A Polymer Electrolyte-Based Rechargeable Lithium/Oxygen Battery", *Journal of the Electrochemical Society*, vol. 143, (1996), pp. 1-5.

Dudney, Nancy J., "Addition of a thin-film inorganic solid electrolyte (Lipon) as a protective film in lithium batteries with a liquid electrolyte", *Journal of Power Sources*, vol. 89, (2000), pp. 176-179.

Read, J , "Characterization of the Lithium/Oxygen Organic Electrolyte Battery", *Journal of the Electrochemical Society*, 149, (2002), pp. A1190-A1195.

* cited by examiner

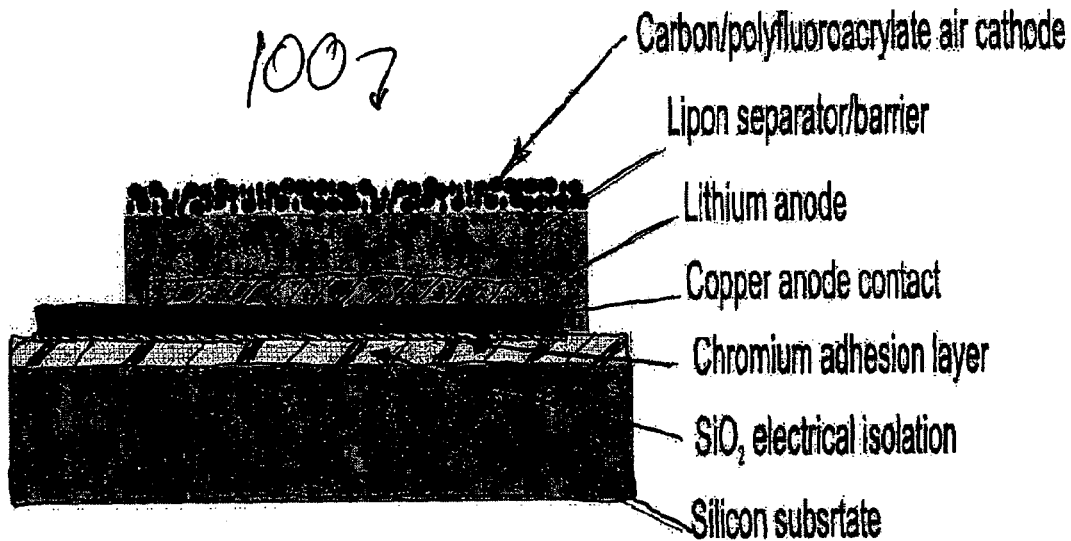
Figure 1. Schematic cross section of lithium-air micro-cell.
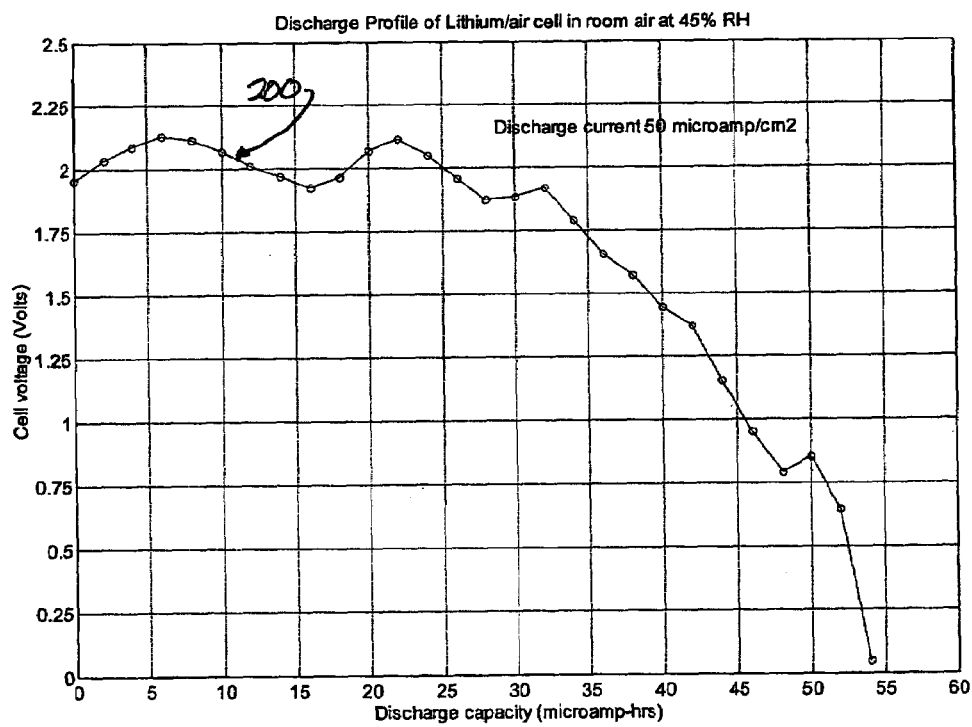
Figure 2. Discharge voltage profile of a lithium-air micro-cell with LiPON separator. Discharge current of 50 □A. 1 cm² device. The cell was initially loaded with 200 □A-hr of lithium metal.

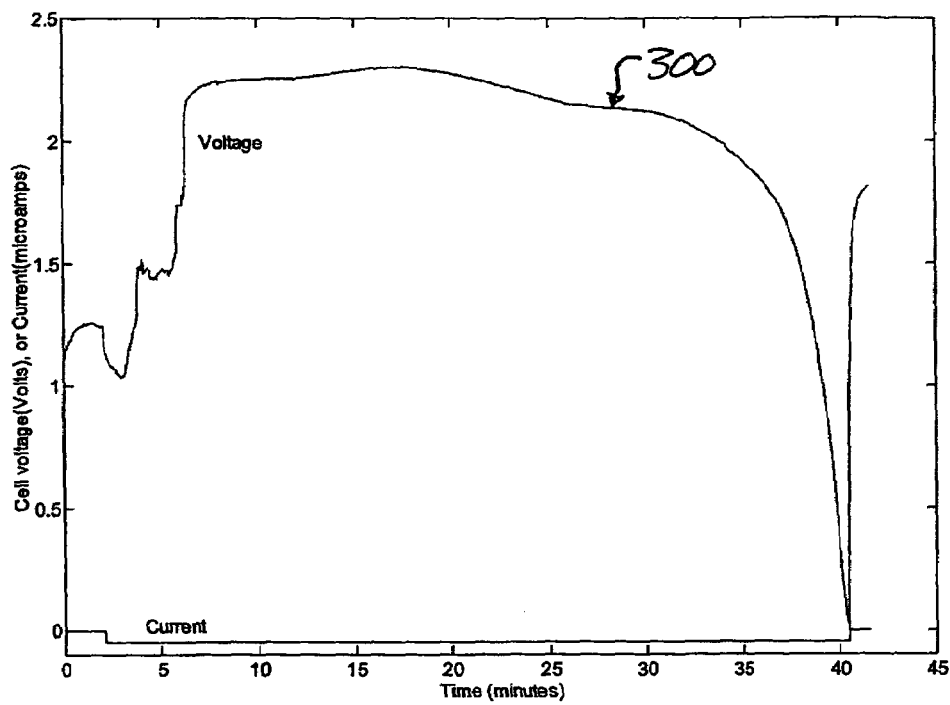

Figure 3. Voltage profile during discharge of Li-air micro-cell with LiPON separator. Low voltage at beginning believed to be from self-healing short.

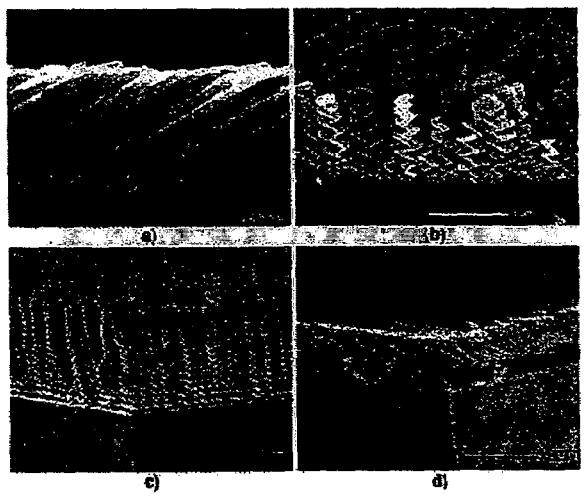

Figure 4. Examples of open, porous structures that can be achieved by vacuum, thin film deposition. These structures were made by glancing angle deposition. *Image from Queen's University, Physics Dept., Kingston, ON K7L3N6, Canada. http://www.physics.queensu.ca/~robbie/glad.html*

LITHIUM/AIR BATTERIES WITH LIPON AS SEPARATOR AND PROTECTIVE BARRIER AND METHOD

CROSS-REFERENCES TO RELATED INVENTIONS

This invention is related to the following:
U.S. patent application Ser. No. 09/816,602 (now U.S. Pat. No. 6,986,965) entitled "Device Enclosures with Integrated Batteries" filed Mar. 23, 2001,
U.S. patent application Ser. No. 09/815,884 entitled "Battery-Operated Wireless-Communication Apparatus and Method," filed Mar. 23, 2001,
U.S. patent application Ser. No. 10/336,620 (now U.S. Pat. No. 6,906,436) entitled "Solid State Activity-Activated Battery Device and Method" filed on Jan. 2, 2003,
U.S. patent application Ser. No. 10/336,619 entitled "APPARATUS AND METHOD FOR DEPOSITING MATERIAL ONTO MULTIPLE INDEPENDENTLY MOVING WEBS," filed on Jan. 2, 2003; and
U.S. patent application Ser. No. 10/336,662 entitled "ACTIVE WIRELESS TAGGING SYSTEM ON PEEL AND STICK SUBSTRATE" filed on Jan. 2, 2003, each of which is incorporated by reference. The various features of the present invention are contemplated to be combined with the methods and apparatus of the above applications

FIELD OF THE INVENTION

This invention relates to the field of solid-state energy-storage devices, and more specifically to a method and apparatus for making lithium/air batteries with LiPON as separator and protective barrier, and the resulting cell(s) and/or battery(s).

BACKGROUND OF THE INVENTION

Electronics have been incorporated into many portable devices such as computers, mobile phones, tracking systems, scanners, etc. One drawback to portable devices is the need to include the power supply with the device. Portable devices typically use batteries as power supplies. Batteries must have sufficient capacity to power the device for at least the length of time the device is in use. Sufficient battery capacity can result in a power supply that is quite heavy or large compared to the rest of the device. Accordingly, smaller and lighter batteries (i.e., power supplies) with sufficient energy storage are desired. Other energy storage devices, such as supercapacitors, and energy conversion devices, such as photovoltaics and fuel cells, are alternatives to batteries for use as power supplies in portable electronics and non-portable electrical applications.

Another drawback of conventional batteries is the fact that some are fabricated from potentially toxic materials that may leak and be subject to governmental regulation. Accordingly, it is desired to provide an electrical power source that is safe, solid-state and rechargeable over many charge/discharge life cycles.

One type of an energy-storage device is a solid-state, thin-film battery. Examples of thin-film batteries are described in U.S. Pat. Nos. 5,314,765; 5,338,625; 5,445,126; 5,445,906; 5,512,147; 5,561,004; 5,567,210; 5,569,520; 5,597,660; 5,612,152; 5,654,084; and 5,705,293, each of which is herein incorporated by reference. U.S. Pat. No. 5,338,625 describes a thin-film battery, especially a thin-film microbattery, and a method for making same having application as a backup or first integrated power source for electronic devices. U.S. Pat. No. 5,445,906 describes a method and system for manufacturing a thin-film battery structure formed with the method that utilizes a plurality of deposition stations at which thin battery component films are built up in sequence upon a web-like substrate as the substrate is automatically moved through the stations.

BRIEF DESCRIPTION OF THE DRAWINGS

FIG. 1 is a schematic cross section view of a lithium-air micro-cell 100.
FIG. 2 shows a discharge voltage profile 200.
FIG. 3 shows the voltage profile during discharge of another Li-air micro-cell.
FIGS. 4($a$), 4($b$), 4($c$), and 4($d$) show micrographs of examples of open, porous structures that can be achieved by vacuum, thin film deposition

DESCRIPTION OF PREFERRED EMBODIMENTS

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. The same reference number or label may refer to signals and connections, and the actual meaning will be clear from its use in the context of the description.

Terminology

In this description, the term metal applies both to substantially pure single metallic elements and to alloys or combinations of two or more elements, at least one of which is a metallic element.

The term substrate or core generally refers to the physical that is the basic work piece that is transformed by various process operations into the desired microelectronic configuration. Substrates may include conducting material (such as copper or aluminum), insulating material (such as sapphire, ceramic, or plastic), semiconducting materials (such as silicon), non-semiconducting, or combinations of semiconducting and non-semiconducting materials. In some embodiments, substrates include layered structures, such as a core sheet or piece of material (such as iron-nickel alloy) chosen for its a coefficient of thermal expansion (CTE) that more closely matches the CTE of an adjacent structure such as a silicon processor chip. In some embodiments, such a substrate core is laminated to a sheet of material chosen for electrical and/or thermal conductivity (such as a copper or aluminum alloy), which in turn is covered with a layer of plastic chosen for electrical insulation, stability, and embossing characteristics. In some embodiments, the plastic layer has wiring traces that carry signals and electrical power horizontally, and vias that carry signals and electrical power vertically between layers of traces.

The term vertical is defined to mean substantially perpendicular to the major surface of a substrate. Height or depth refers to a distance in a direction perpendicular to the major surface of a substrate.

Lithium, the lightest alkali metal, has a unique place in battery systems (see "Handbook of Batteries, 3rd Ed.," David Linden and Thomas B. Reddy, Eds., Sect. 14.2.1 *Chemistry Lithium*, McGraw Hill Handbooks, New York, 2002.). Its gravimetric electrochemical equivalence of 3.86 amp-hrs/g is the highest of any metallic anode material. Coupling a lithium anode with an oxygen (air) cathode would lead to a very light, high energy density battery. The difficulty with lithium-air technology is providing practical systems that operate in real world conditions, and the major shortcoming is the corrosion of the lithium anode from oxygen and atmospheric water vapor. A solution to the rapid corrosion of lithium metal anodes in lithium-air cells is the use of LiPON as a protective barrier and separator in the structure of an organic electrolyte, lithium-air cell.

Hybrid micro-cells have be made that utilize a carbon air organic polymer cathode and a LiPON thin film acting as both the separator and a protective barrier against moisture and oxygen corrosion of the lithium metal anode. These cells delivered 50 microamp-hrs of capacity, or 25% utilization of the available lithium, when discharged in air, and at 45% relative humidity.

The structure of thin, flexible, lithium-air cells lends itself well to the high speed web-deposition processes developed at Cymbet Corporation that are described in the above-cited patent applications.

In some embodiments, such a hybrid cell utilizes a carbon air organic polymer cathode and a LiPON thin film acting as both the separator and a protective barrier against moisture and oxygen corrosion of the lithium metal anode. The structure of thin, flexible, lithium-air cells lends itself well to the high speed web-deposition processes developing at Cymbet.

TABLE 1

Summary of other Lithium/Air research

| Metal anode | Electro-chemical equivalent of metal, Ah/g | Theoretical cell voltage, * V | Valence change | Theoretical specific energy (of metal), kWh/kg | Practical operating voltage, V |
| --- | --- | --- | --- | --- | --- |
| Li | 3.86 | 3.4 | 1 | 13.0 | 2.4 |
| Ca | 1.34 | 3.4 | 2 | 4.6 | 2.0 |
| Mg | 2.20 | 3.1 | 2 | 6.8 | 1.2–1.4 |
| Al | 2.98 | 2.7 | 3 | 8.1 | 1.1–1.4 |
| Zn | 0.82 | 1.6 | 2 | 1.3 | 1.0–1.2 |
| Fe | 0.96 | 1.3 | 2 | 1.2 | 1.0 |

* Cell voltage with oxygen cathode
Characteristics of metal-air cells. From "Handbook of Batteries, 3rd Ed.," David Linden and Thomas B. Reddy, Eds., Table 38.2, McGraw-Hill Handbooks, New York, 2002.

Metal-air batteries are unique in that they utilize oxygen from the atmosphere as the cathode reactant. The cells need only be loaded with the metal anode at construction as the oxygen consumed at the cathode is taken from the ambient. This construction method allows metal-air cells to have extremely high energy densities. Numerous metals can be used as the anode in metal-air cells. The most common metal-air system is Zinc-air. Zinc is the most electronegative metal that has good stability and corrosion resistance, with the appropriate inhibitor chemistry, in aqueous solutions. Several possible metal-air systems are listed in Table 1 along with a summary of their theoretical characteristics.

It can be seen from the table that the metal with the highest operational voltage and greatest theoretical specific energy is lithium. Surprising as it may seem, it is possible to construct lithium-air cells utilizing an aqueous electrolyte, but these cells have limited applicability due to corrosion of the lithium metal anode by water.(see E. L. Littauer and K. C. Tsai, Journal of the Electrochemical Society, 124, 850 (1977); and "Handbook of Batteries, 3rd Ed.," Section 38.6 Lithium/Air Batteries, David Linden and Thomas B. Reddy, Eds., McGraw-Hill Handbooks, New York (2002).)

A significant advance to practical lithium-air technology came in 1996 when Abraham and Jiang (see "Apolymer Electrolyte-Based Rechargeable Lithium/Oxygen Battery," K. M. Abraham and Z. Jiang, Journal of the Electrochemical Society, 143, 1–5 (1996); and "Solid Polymer Electrolyte-Based Oxygen Batteries," K. M. Abraham and Z. Jiang, U.S. Pat. No. 5,510,209) demonstrated a cell with a nonaqueous polymer separator consisting of a film of polyacrylonitrile swollen with a propylene carbonate/ethylene carbonate/$LiPF_6$ electrolyte solution. This organic electrolyte membrane was sandwiched between a lithium metal foil anode and a carbon composite cathode to form the lithium-air cell. The utilization of the organic electrolyte allowed good performance of the cell in an oxygen or dry air atmosphere. The authors reported the cells delivered a specific energy of 250–350 Whr/kg, based on the mass of the electrodes and electrolytes but not including the mass of the envelope package. Capacity was limited by the formation of the $Li_2O_2$ discharge product which eventually blocked the pores of the carbon cathode. These authors determined that the particle size of the carbon powder used in the air cathode had a strong effect on the discharge capacity of the cells—smaller particle, higher surface area powder producing greater capacity. With use of a cobalt phthalocyanine catalyst coating the carbon of the air cathode, the $Li_2O_2$ discharge product could be reoxidized to oxygen and the cells recharged. Only a few cycles were demonstrated but the capacity fade appeared minimal.

A more recent investigation of lithium-air cells with organic electrolytes was carried out by J. Read (see "Characterization of the Lithium/Oxygen Organic Electrolyte Battery," Journal of the Electrochemical Society, 149 A1190–A1195 (2002)) at Army Research Labs. In this work different methods of preparing the carbon air cathodes were compared as were various solvents for the electrolyte solution. The cells were tested in pouches sealed with pure, dry oxygen. It was found that electrolyte formulation had the largest effect on the capacity of the cells. The solubility of oxygen in the electrolyte was a key factor. Unlike the earlier work by Abraham and Jiang, the surface area of the carbon air electrode was not found to have a large effect on the cell capacity. Reversibility was also observed, but only for cells that had $\lambda$-$MnO_2$ in the cathode formulation. Significant capacity fade was seen beyond 4–5 cycles In their work, Abraham and Jiang made a preliminary estimate of shelf-life, or self discharge, of the lithium/air, organic electrolyte battery by storing a cell in flowing $O_2$ for 5 days and comparing its discharge capacity to a freshly made cell. The stored cell delivered ~95% of the capacity of a fresh cell when discharged under similar conditions. The authors discussed the need to protect the lithium anode from oxygen and moisture in order to extend shelf-life. A method of providing protection for the lithium anode from oxygen and moisture can be achieved by using LiPON as the separator in lithium-air cells. LiPON functions in the dual role as separator and as a barrier preventing oxygen and moisture from reaching the lithium metal anode while still allowing lithium ion transport from the lithium metal anode to the air cathode.

Lithium-Air Microbatteries with LiPON Separators

To demonstrate the feasibility of LiPON as the separator in a lithium-air cell, a few proof-of-principle micro-cells, representing some embodiments of the invention, were built at Cymbet. These devices had 1 cm$^2$ active area and were charged with 200 microamp-hrs of lithium metal. The air cathode was a carbon/polyfluoroacrylate coating (Novec-1700) saturated with a propylene carbonate/LiPF$_6$ organic electrolyte solution. The intent of the experiment was to demonstrate feasibility of LiPON as the separator in the cell. As the earlier work on lithium-air cells described above has indicated, both the formulation of the liquid electrolyte and the method of constructing the carbon air cathode have significant effects on discharge capacity. Yet without any optimization of the carbon air cathode the cells delivered 50 microamp-hrs of capacity, or 25% utilization of the available lithium, when discharged in air, and at 45% relative humidity.

Description of Lithium-Air Microcell Fabrication Technique

FIG. 1 shows a schematic cross section of a lithium-air micro-cell 100.

1) Vacuum Deposition of Cr/Cu Anode Contact

The lithium-air micro-cells were built on silicon wafers having 5000 Å of an electrically isolating thermal oxide. Silicon is a convenient substrate to work with, but it is not essential to the structure of the device. Any of a number of supporting substrates could be used—metal foils, plastics, rigid ceramics. With an electrically insulating substrate it is necessary to form a conductive contact. This was done by vacuum sputter deposition of 500 Å of chromium followed by 5000 Å of copper. The thin chromium layer is used to provide adhesion between the SiO$_2$ surface and the thicker copper layer.

2) Deposition of LiPON Separator

LiPON (Lithium Phosphorous OxyNitride) is an inorganic thin film formed by the low pressure (<10 mtorr) sputter deposition of lithium orthophosphate (Li$_3$PO$_4$) in nitrogen. LiPON is an electrically insulating lithium ion conductor. Its ionic conductivity depends strongly on the percentage of nitrogen incorporated into the film during the sputter deposition process. Lithium ion conductivity is in the range of 2–3 µS cm-1 at a nitrogen content in the range of 2–3 atomic percent.

For the Li-air micro-cells LiPON was deposited over the copper anode contact at a thickness of 2.5 microns.

3) Electroplated Lithium Metal in Liquid Electrolyte

A layer of lithium metal was formed on the copper anode contact by electroplating in a propylene carbonate/LiPF$_6$ electrolyte solution. The LiPON layer is not affected by immersion in the organic electrolyte solution. It is a lithium ion conductor, electrical insulator. It allows Li+ transport from the electrolyte solution. Lithium metal only plates at the copper contact under the LiPON layer.

The counter electrode for plating was lithium metal. Electroplating was done at current densities between 0.6 mA/cm$^2$ and 1.2 mA/cm$^2$. The voltage between the lithium metal counter electrode and the lithium plated underneath the LiPON on the micro-cell was ~40 mV at 0.6 mA. Plating was terminated after 0.2 mA-hr of charge had been transferred. The copper contact metal turned to a shiny, silvery metallic after lithium metal was plated.

Loading and unloading of the lithium plating apparatus was carried out in a dry nitrogen purged glovebox to prevent corrosion of the counter electrode and moisture uptake in the electrolyte solvent. The glovebox was used only to load the Cu/LiPON sample, lithium metal foil, and electrolyte into a glass jar with sealed leads to the electrodes. The jar was purged (to some extent) by blowing argon into the top (in the N$_2$ glovebox) while quickly closing the lid. The jar was then transferred to room ambient for connection to the EG&G 273A potentiostat. After plating lithium, the jar went back into the glovebox to remove the plated sample. The sample with lithium under the LiPON was then brought out to room ambient for finishing the carbon/air cathode and the subsequent testing.

4) Micro-Cell Handling and Cleaning

After lithium was plated under the protective LiPON layer, the micro-cell was removed from the plating apparatus in the dry nitrogen glovebox and transferred back to open room conditions for the remainder of the cell assembly. Although the relative humidity in the room was 45% RH, the shiny metallic appearance of the electroplated lithium did not tarnish. The LiPON layer provides protection from the rapid corrosion that would be expected in these conditions.

The residual electrolyte solution was cleaned from the cell by rinsing in isopropyl alcohol and blow drying with nitrogen.

5) Carbon/Polyfluoroacrylate Air Cathode Coating

To form a carbon air cathode, a slurry of graphite powder (Alpha Aesar, conducting, synthetic, −325 mesh) was made with a polyfluoroacrylate (3M Novec-1700, 5% solids) solution. The solution was 15% carbon by weight. The micro-cell was dipped in the slurry and quickly removed. The Novec solution dries almost instantly leaving an adherent layer of carbon/polyfluoroacrylate on the LiPON separator. The dipping procedure was repeated 3–4 times to get an opaque overcoat of the carbon/polyfluoroacrylate.

6) Application of PC/LiPF$_6$ Electrolyte

The carbon/polyfluoroacrylate air cathode was activated by applying a drop of electrolyte solution (propylene carbonate/LiPF$_6$). The solution penetrates the relatively open structure of the carbon/polyfluoroacrylate air cathode and also wets the surface of the LiPON separator.

The fabrication process for this hybrid, solid state/organic liquid electrolyte cell structure can be scaled to deliver higher capacity cells. Manufacturing techniques to scale to amp-hour capacity are also realistic with the roll-to-roll, web deposition technique being developed at Cymbet. If a technique can be developed to electroplate lithium in the roll-to-roll process, the only vacuum deposited materials need be the anode contact metal and the LiPON separator. This would greatly minimize problems with building thick, vacuum deposited layers in a web process.

Electrochemical Evaluation of Lithium-Air Micro-Cells

The lithium-air micro-cells fabricated by the procedure described above were tested for their discharge capacity. The cells were discharged in room air at 45% RH. The 1 cm$^2$ active area cells were discharged at 50 microamps using an EG&G 273A potentiostat.

FIG. 2 shows a discharge voltage profile 200 of a lithium-air micro-cell with LiPON separator. Discharge current of 50 microamp/cm$^2$ device. The cell was initially loaded with 200 microamp-hr of lithium metal. The initial open circuit potential of this cell was 2.4 V. The discharge time was a little more than one hour. The cause of the periodic oscillations is unknown. It may be due to variations in room air flow from the air conditioning system. It was observed that the cell voltage increased by blowing air across the surface. Flooding the surface with argon caused the voltage to plummet.

FIG. 3 shows the voltage profile during discharge of another Li-air micro-cell with LiPON separator. During the first few minutes of discharge the cell voltage is low and erratic. Low voltage at beginning believed to be from self-healing short. It then rises to about 2.25 V and becomes stable. The cause is unknown but it is suspected that there was a defect in the LiPON separator that allowed an electrical short between the two electrodes. This caused a large drain on the cell that continued until the lithium near the defect was totally consumed—converted to lithium oxide. After the lithium "burns" away near the defect, the defect is no longer an electrical short. While it is not desirable to have any defects in the separator, this self-healing effect could be a strong feature of practical devices.

Attempts were made to recharge some embodiments of the micro-cells, but these were unsuccessful—not a surprising result considering the simple formulation of the carbon air cathode.

The cells were taken apart after discharge. The LiPON separator was still intact. The plated lithium was entirely gone down to the surface of the copper contact. Some staining of the copper was apparent. Staining may be associated with defects in the LiPON layer. If so, this may represent a point where side reactions occur. Reduction in defects may dramatically improve the utilization of the cells.

All Solid State, Li/Air Cell

Some embodiments provide a solid state, inorganic air cathode. The hybrid structure utilizing a LiPON coating as protection for the lithium metal anode from corrosion due to oxygen and moisture may be realistic, but the air cathode still requires an organic liquid solvent electrolyte to wet the carbon on which the lithium oxide discharge products are formed.

The carbon/Novec air cathode coating was first tried without wetting the sample with liquid electrolyte. This dry construction had an OCV<1 V, and it was not possible to pull current from it. After wetting with electrolyte this particular example gave the discharge curve shown in FIG. 3. As can be seen in the figure, the voltage at the beginning of the discharge is erratic even with the liquid electrolyte.

The hybrid construction may be suitable to create a lithium/air battery with a long shelf life, particularly if the major limitation is degradation of the lithium metal anode from corrosion by oxygen and water vapor that penetrate the polymer/composite air cathode. But the organic solvents used in the cathode still represent a long term potential failure in terms of the flammability of the materials, the need for exposure to the environment, and the eventual evaporative loss of volatile, liquid components.

FIGS. 4(a), 4(b), 4(c), and 4(d) show examples of open, porous structures that can be achieved by vacuum, thin film deposition. These structures were made by glancing angle deposition. Image from Queen's University, Physics Dept., Kingston, ON K7L3N6, Canada. http://www.physics.queensu.ca/~robbie/glad.html Some embodiments provide a vacuum deposited solid state, inorganic air cathode. In some embodiments, the air cathode needs to be both electrically conducting and provide good transport to lithium ions. In some embodiments, the structure must be porous to oxygen and have sufficient surface area for the deposition of the lithium oxide products. In some embodiments, such a material is created from the codeposition of carbon and the LiPON separator material. Carbon provides electrical conductivity and nucleation sites for lithium oxide deposition. LiPON would provide an ionic conductive path for lithium. In some embodiments, the entire structure is made porous on a submicron scale by adjusting the deposition conditions. For example, the vacuum deposition technique of glancing angle deposition (GLAD) (See,for example, K. Robbie, C. Shafai, and M. J. Brett, "Thin Films with Nanometer Scale Pillar Microstructures", *Journal of Materials Research* 14, 3158–3163 (1999) and J. C. Sit, D. Vick, K. Robbie, and M. J. Brett, "Thin Film Microstructural Control Using Glancing Angle Deposition by Sputtering", *Journal of Materials Research* 14, 1197–1199 (1999).) allows highly structured, intricate columns of material to be made on the sub-micron scale, But elaborate techniques such as GLAD may not even be necessary. It is possible to create highly columnar, open structure thin films by adjusting the deposition conditions. Typically increasing the pressure creates a more columnar structure. Power, deposition rate, throw distance, deposition angle—all affect the structure of the thin-film.

Some embodiments include an apparatus that includes a lithium anode; a polymer-air cathode; and a LiPON separator between the anode and cathode. In some embodiments, the polymer-air cathode includes a carbon-polyfluoroacrylate material. In some embodiments, the anode overlays a copper anode contact.

In some embodiments, the invention includes a method including: depositing a lithium anode on a substrate, depositing a LiPON separator over the anode, and depositing a polymer-air cathode on the separator. In some embodiments, the polymer-air cathode includes a carbon-polyfluoroacrylate material. In some embodiments, the anode is deposited as a layer on a copper anode contact layer.

In some embodiments, the invention includes an apparatus that includes a lithium anode on a substrate; and means for depositing a LiPON separator over the anode and for depositing a polymer-air cathode on the separator. In some embodiments, the polymer-air cathode includes a carbon-polyfluoroacrylate material. The apparatus of claim 8, wherein the anode contacts a copper anode contact layer.

It is understood that the above description is intended to be illustrative, and not restrictive. Many other embodiments will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first" "second," and "third," etc., are used merely as labels, and are not intended to impose numerical requirements on their objects.

What is claimed is:

1. An apparatus comprising:
  a lithium anode;
  a polymer-air cathode;
  a LiPON separator between the anode and cathode; and
  wherein the apparatus is configured to be activated after assembly by penetrating an electrolyte solution through the cathode.

2. The apparatus of claim 1, wherein the electrolyte solution includes propylene carbonate/LiPF6.

3. The apparatus of claim 1, wherein the apparatus includes a substrate, wherein the lithium anode is formed onto the substrate by electroplating through the LiPON layer, such that the lithium anode is between the substrate and the LiPON layer.

4. The apparatus of claim 3, wherein the substrate includes silicon.

5. The apparatus claim 4, wherein the substrate includes a conductive layer that includes chromium.

6. The apparatus of claim 5, wherein the substrate includes a conductive layer that includes copper between the lithium anode and the chromium.

7. The apparatus of claim 3, wherein the substrate includes metal foil.

8. The apparatus of claim 3, wherein the substrate includes one or more plastics.

9. The apparatus of claim 3, wherein the substrate includes one or more ceramics.

10. An apparatus comprising:
a lithium anode;
a polymer-air cathode;
a LiPON separator between the anode and cathode; and
wherein the polymer-air cathode includes a carbon-polyfluoroacrylate material.

11. The apparatus of claim 10, wherein the anode overlays a copper anode contact.

12. A method comprising:
depositing a LiPON separator on a substrate;
depositing a lithium anode on the substrate through the LiPON separator;
depositing a polymer-air cathode on the separator; and
activating battery functionality after assembly by penetrating an electrolyte solution through the cathode.

13. The method of claim 12, wherein the electrolyte solution includes propylene carbonate/$LiPF_6$.

14. The method of claim 12, wherein the depositing a lithium anode includes electroplating through the LiPON separator.

15. A method comprising:
depositing a lithium anode on a substrate;
depositing a LiPON separator over the anode;
depositing a polymer-air cathode on the separator; and
wherein the polymer-air cathode includes a carbon-polyfluoroacrylate material.

16. The method of claim 15, wherein the anode is deposited as a layer on a copper anode contact layer.

17. An apparatus comprising:
a LiPON separator on a substrate;
means for depositing a lithium anode through the LiPON separator and on the substrate;
means for depositing a polymer-air cathode on the separator to form a non-activated battery; and
means for activating battery functionality after assembly by penetrating an electrolyte solution through the cathode.

18. The apparatus of claim 17, wherein the electrolyte solution includes propylene carbonate/$LiPF_6$.

19. The apparatus of claim 17, further comprising
a substrate, wherein the lithium anode is formed onto the substrate by electroplating through the LiPON layer, such that the lithium anode is between the substrate and the LiPON layer.

20. An apparatus comprising:
a lithium anode on a substrate;
means for depositing a LiPON separator over the anode and for depositing a polymer-air cathode on the separator; and
wherein the polymer-air cathode includes a carbon-polyfluoroacrylate material.

21. The apparatus of claim 20, wherein the anode contacts a copper anode contact layer.

* * * * *